United States Patent [19]

Souillard

[11] 4,327,392

[45] Apr. 27, 1982

[54] PROTECTIVE APPARATUS FOR USE WITH POWER LINES

[75] Inventor: Michel Souillard, Fontenay aux Roses, France

[73] Assignee: Enertec, Montrouge, France

[21] Appl. No.: 197,050

[22] Filed: Oct. 15, 1980

[30] Foreign Application Priority Data

Oct. 17, 1979 [FR] France ................. 79 25784

[51] Int. Cl.³ .................. H02H 3/48; H02H 3/42
[52] U.S. Cl. ............................ 361/80; 307/84; 324/91
[58] Field of Search ........... 307/84; 361/20, 68, 361/80, 82, 84; 324/86, 91

[56] References Cited

U.S. PATENT DOCUMENTS 2,405,083 7/1946 Warrington ................. 361/80
2,561,848 7/1951 Dewey ........................ 361/68

OTHER PUBLICATIONS

Elektrie vol. 21, No. 11 (Nov. 1967) p. 195.
L. Mouton and M. Souillard "Relais Statiques Ultra-Rapides pour Mésures de Distance", C. I. G. R. E., Jun. 1968.

Primary Examiner—Michael L. Gellner
Assistant Examiner—James L. Dwyer
Attorney, Agent, or Firm—Dale V. Gaudier; Mikio Ishimaru

[57] ABSTRACT

The invention relates to protective apparatus used on AC power lines. An embodiment of an apparatus for putting the invention into practice comprises impedance sensing means having an impedance characteristic defining at least three distinguishable zones in its RX diagram, and being arranged to produce respective different signals, one for each zone, indicating the zone in which the sensed impedance lies. The movement of the point representative of the apparent impedance of the line across these zones is different according to whether the movement is due to loss of synchronism between the generators supplying the line or due to power oscillations. A logic circuit is provided to detect this difference in movement.

5 Claims, 3 Drawing Figures

PROTECTIVE APPARATUS FOR USE WITH POWER LINES

This invention relates to protective apparatus for use with an A.C. electrical power line, and is more particularly concerned with such protective apparatus for use when the line is coupled between at least two generators whose operation is normally synchronised, to provide protection in the event of loss of synchronism between the generators.

A problem encountered in the protection of A.C. power lines against various fault conditions is to rapidly and reliably distinguish the initial effects of a fault condition from the somewhat similar effects which can be produced during power oscillations.

It has already been proposed, e.g. in the paper entitled "Relais Statiques Ultra-Rapides pour Mésures de Distance" ("Ultra-fast Static Relays for Distance Measurement") presented by L. Mouton and M. Souillard at CIGRE (Conference Internationale des Grands Réseaux Electriques à haute tension) in the Session held from June 10–20, 1968, to use two static (or solid state) measurement relays of the "resistance-inductance" type (also known as impedance relays) to detect power oscillations, in order to permit the spurious operation of protective apparatus of which the two relays form part in response to power oscillations to be inhibited. As described with reference to FIG. 4.3 in chapter 4 of the paper, each of the two relays has an impedance characteristic defining two parallel straight lines in its RX diagram, the two straight lines $D_1$ and $D_2$ of one relay lying between the two straight lines $D_1'$ and $D_2'$ of the other relay.

However, when this already-proposed relay arrangement is used with a power line coupled between normally-synchronised generators, it cannot rapidly and reliably distinguish power oscillations from loss of synchronism between the generators. This can be disadvantageous, since while power oscillations may require no remedial action (or may require remedial action only if they persist), loss of synchronism is potentially more serious and may require more prompt remedial action.

It is therefore an object of the present invention to provide protective apparatus for use with a power line coupled between normally-synchronised generators, in which apparatus the problem of distinguishing loss of synchronism from power oscillations is overcome.

According to the present invention, there is provided protective apparatus for use with an A.C. electrical power line coupled between normally-synchronised generators, the apparatus comprising:

means for sensing the apparent impedance of the line, said impedance sensing means having an impedance characteristic defining at least three distinguishable zones in its RX diagram and being arranged to produce respective different signals, one for each zone, indicating the zone in which the sensed impedance lies, two of said zones being separated by the third and said zones being selected such that the apparent impedance of the line changes from one of said two zones to the other via the third zone in the event of loss of synchronism between the generators but is not likely to do so in the event of power oscillations; and circuit means connected to receive the zone-indicative signals and arranged to produce an output signal in response to at least one predetermined sequence thereof, said sequence being chosen to distinguish loss of synchronism between the generators from power oscillations.

The circuit means is preferably responsive to each possible zone-indicative signal sequence indicative of loss of synchronism between the generators, whereby said output signal is indicative of loss of synchronism, and is advantageously also responsive to each possible zone-indicative signal sequence indicative of significant power oscillations to produce a further output signal, whereby said further output signal is indicative of said significant power oscillations.

In a preferred embodiment of the invention, the impedance sensing means comprises two band-type impedance relays each having an impedance band defined by two parallel straight lines in its RX diagram, the bands being parallel and having an area of overlap.

The invention will now be described, by way of example only, with reference to the accompanying drawings, of which:

Figure 1:
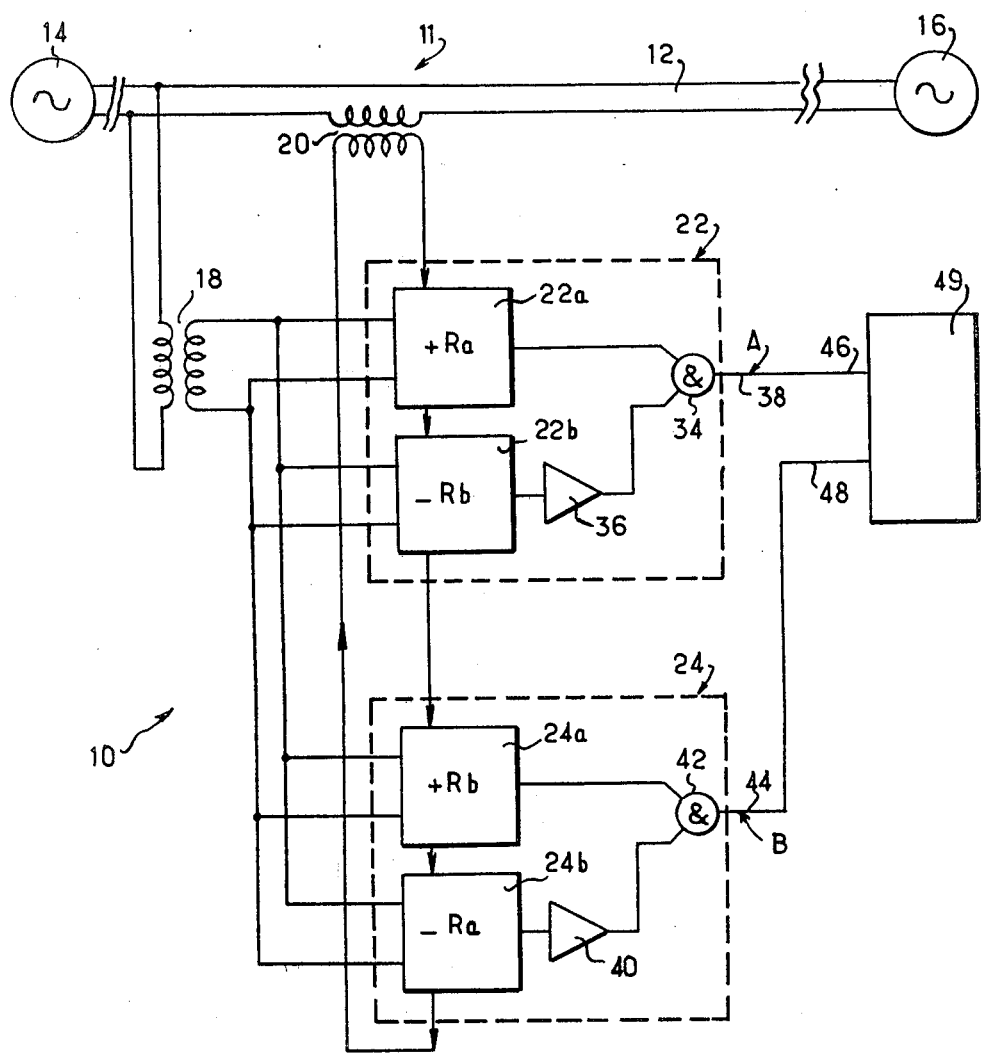
FIG. 1 is a schematic block circuit diagram of protective apparatus in accordance with the present invention.

The protective apparatus illustrated in FIG. 1 is indicated generally at 10, and is shown coupled to a convenient measurement point 11 on a high voltage power line 12 which extends between two normally synchronised generators 14 and 16. The coupling of the apparatus 10 to the line 12 is effected via a voltage transformer 18, which provides the apparatus 10 with a first input signal representative of the voltage of the line 12 at the measurement point 11, and also via a current transformer 20, which provides the apparatus 10 with a second input signal representative of the current flowing in the line 12 at the measurement point 11.

Figure 2:
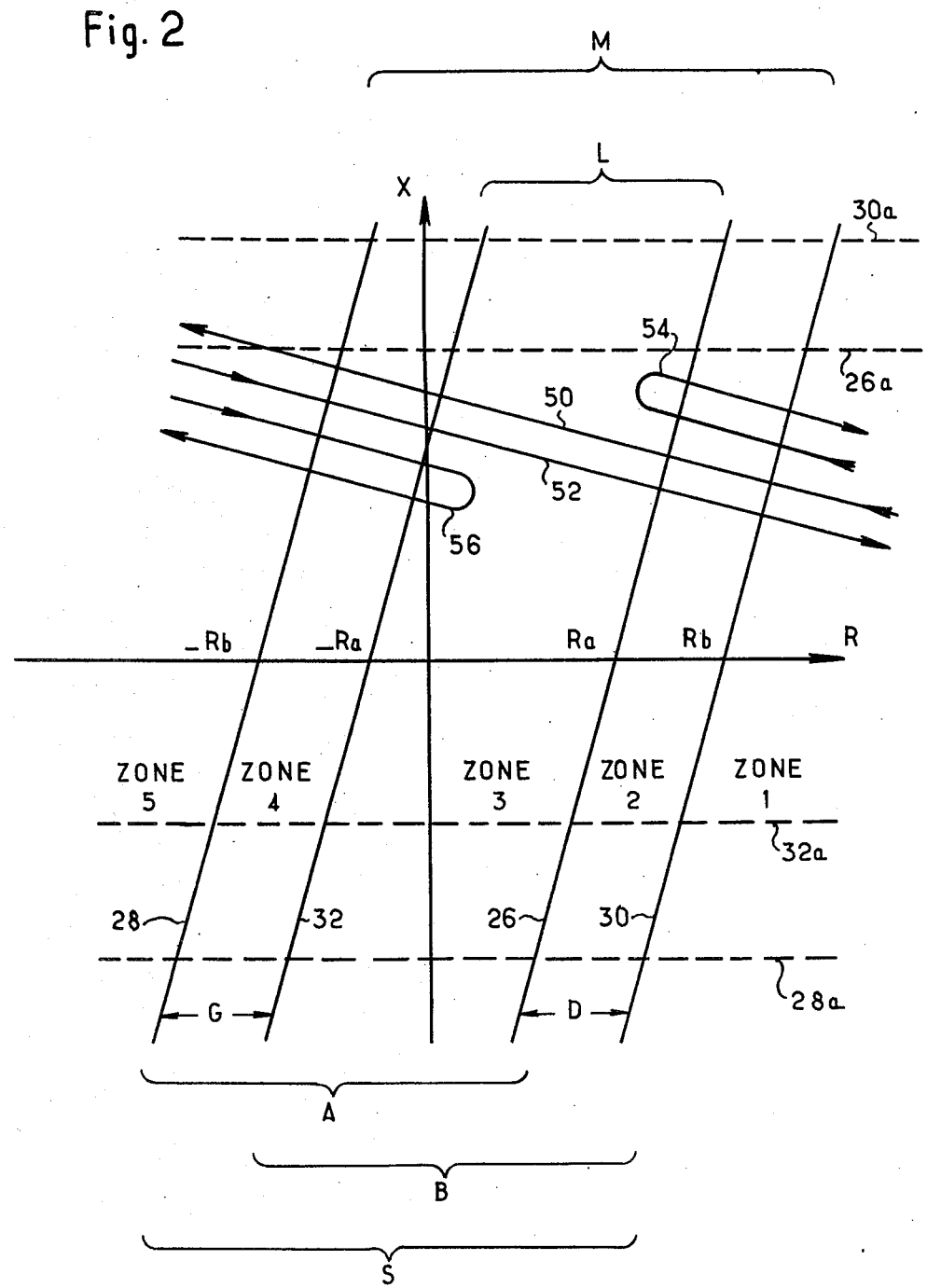
FIG. 2 is an RX diagram illustrating the impedance characteristics of the apparatus of FIG. 1.

The apparatus 10 comprises two conventional impedance relays 22, 24 of the band type, each of these relays being arranged to use the voltage and current input signals provided by the transformers 18 and 20 to sense whether or not the apparent impedance with the line 12, as seen from the measurement point 11, lies within a predetermined band of values defined between two parallel straight lines in the RX diagram of the relay. For reasons which will become apparent hereinafter, the relays 22, 24 have parallel overlapping bands as shown in FIG. 2, the band for the relay 22 being defined between the lines 26 and 28 (which have intercepts on the R axis at $+R_a$ and $-R_b$ respectively, where $R_b > R_a$), and the band for the relay 24 being defined between the lines 30 and 32 (which have intercepts on the R axis at $+R_b$ and $-R_a$ respectively). As will also become apparent hereinafter, the overlapping bands define five distinct zones, indicated at 1 to 5 in FIG. 2, of which zones 1 to 4 (or 2 to 5) are readily distinguishable from each other.

Each of the relays 22, 24 itself comprises two impedance relays 22a, 22b and 24a, 24b of the linear characteristic type, each arranged to define a respective one of the lines 26, 28, 30 and 32.

The relays 22a, 22b, 24a, 24b may each be of the type described with reference to FIGS. 1 and 2 of UK Patent Specification No. 1,140,023, the values of the components therein being selected in accordance with the teaching of that specification to position the characteristic lines 26, 28, 30 and 32 as specified above and as shown in FIG. 2 hereof. Each of the relays 22a, 22b, 24a, 24b produces a respective two-state logic signal indicating whether the impedance sensed by the relay lies to the right or left of its respective characteristic line. Assuming that a logic 1 signal indicates the sensed impedance lies to the left of the characteristic line, then if the output of the relay 22a is applied to one input of a two-input AND gate 34, and the output of the relay 22b is connected to the other input of the AND gate 34 via an inverter 36, the AND gate will produce at its output 38 a logic 1 signal A when the apparent impedance of the line 12 as seen from the point 11 lies in the band defined between the lines 26, 28. The logic signals produced by the relays 24a, 24b are similarly combined by an inverter 40 and an AND gate 42, which latter thus produces at its output 44 a logic 1 signal B when the apparent impedance of the line 12 as seen from the point 11 lies in the band between the lines 30, 32.

Figure 3:
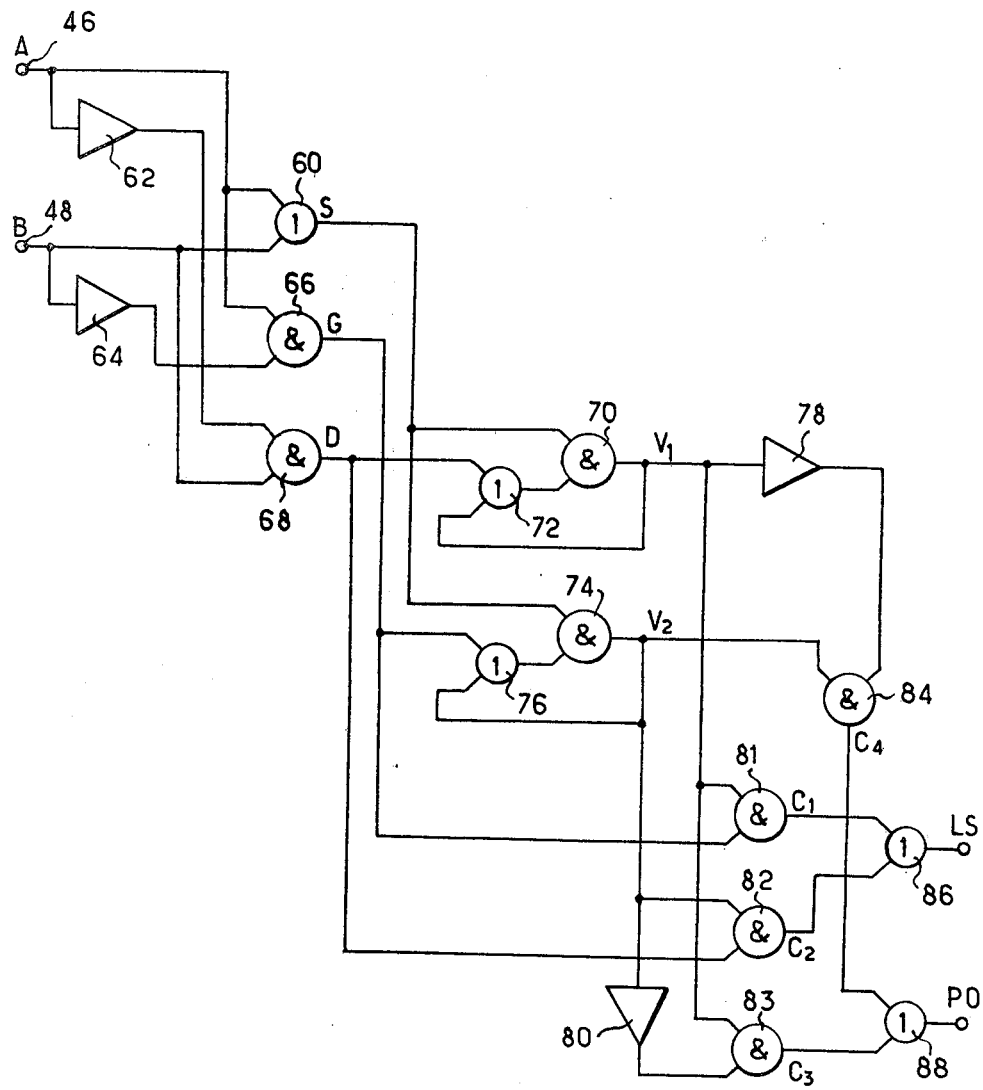
FIG. 3 is a block diagram of a simplified sequential logic circuit forming part of the apparatus of FIG. 1.

The respective outputs 38 and 44 of the AND gates 34 and 42 also constitute the outputs of the band-type impedance relays 22 and 24 respectively, and are connected to respective inputs 46, 48 of a sequential logic circuit 49 whose construction and operation will be described in detail with reference to FIG. 3.

The generators 14, 16 normally generate substantially equal A.C. voltages, and although there may be a substantial phase difference between the voltages, the generators operate in synchronism under the control of voltage, speed and power regulators. Under fault-free conditions, the apparent impedance of the power line 12, as seen from the measurement point 11, will normally lie either to the right of the rightmost line (ie the line 30), in zone 1 of the RX diagram of FIG. 2, or to the left of the leftmost line, ie the line 28, in zone 5 of the diagram, the relative positions of the lines being adjusted as appropriate to achieve this.

It can be shown that in the event of loss of synchronism between the generators 14 and 16, the point representing the apparent impedance of the power line 12 will move from its initial position on one side of the RX diagram right across to the other side, following a path such as that indicated at 50 or 52: the paths 50 and 52 are straight lines if the respective voltages generated by the generators 14, 16 are equal, otherwise they are arcs of circles of relatively large radius.

In the event of power oscillations, on the other hand, it can be shown that the point representing the apparent impedance of the power line 12 will first move from its aforementioned initial position into the centre of the RX diagram, ie into the area between the lines 26 and 32 where the respective bands of the relays 22,24 overlap, and then return to its initial position, the reversal of direction occurring at the instant when the power oscillations reach their maximum amplitude: two typical examples of the paths followed by the point representing the apparent impedance of the power line 12 during power oscillations are indicated at 54 and 56.

It will be appreciated that in the previously-proposed relay arrangement mentioned in the introduction hereof, the lines $D_1$ and $D_2$ can be considered equivalent to the lines 26 and 32 respectively of FIG. 2, while the lines $D_1'$ and $D_2'$ can be considered equivalent to the lines 30 and 28 respectively of FIG. 2: the previously-proposed relay arrangement therefore defines two coaxial bands (ie one band wholly within the other) rather than the two overlapping bands defined by the relays 22, 24 of the apparatus 10. Assuming the previously-proposed relay arrangement produces a logic signal L when the sensed impedance lies in the inner band and a logic signal M when the sensed impedance lies in the outer band, as indicated in FIG. 2, a sensed impedance varying in accordance with the respective paths 50, 52, 54, 56 would produce the sequences of combined logic signals shown in Table I below.

TABLE I

| Path | Zone sequence / Logic signal sequence | | | | |
|---|---|---|---|---|---|
| 50 | 1 $\overline{L}.\overline{M}$ | 2 $\overline{L}.M$ | 3 L.M | 4 $L.\overline{M}$ | 5 $\overline{L}.\overline{M}$ |
| 52 | 5 $\overline{L}.\overline{M}$ | 4 $\overline{L}.M$ | 3 L.M | 2 $\overline{L}.M$ | 1 $\overline{L}.\overline{M}$ |
| 54 | 1 $\overline{L}.\overline{M}$ | 2 $\overline{L}.M$ | 3 L.M | 2 $\overline{L}.M$ | 1 $\overline{L}.\overline{M}$ |
| 56 | 5 $\overline{L}.\overline{M}$ | 4 $\overline{L}.M$ | 3 L.M | 4 $\overline{L}.M$ | 5 $\overline{L}.\overline{M}$ |

It is clearly apparent from Table 1 that the impedance variation represented by paths 50 and 52, resulting from loss of synchronism between the generators 14 and 16, cannot be distinguished from the impedance variation represented by paths 54 and 56, resulting from power oscillations.

However, with the relays 22 and 24, a sensed impedance varying in accordance with the respective paths 50, 52, 54, 56 produces the sequences of combined logic signals shown in Table II below.

TABLE II

| Path | Zone sequence / Logic signal sequence | | | | |
|---|---|---|---|---|---|
| 50 | 1 $\overline{A}.\overline{B}$ | 2 $\overline{A}.B$ | 3 A.B | 4 $A.\overline{B}$ | 5 $\overline{A}.\overline{B}$ |
| 52 | 5 $\overline{A}.\overline{B}$ | 4 $A.\overline{B}$ | 3 A.B | 2 $\overline{A}.B$ | 1 $\overline{A}.\overline{B}$ |
| 54 | 1 $\overline{A}.\overline{B}$ | 2 $\overline{A}.B$ | 3 A.B | 2 $\overline{A}.B$ | 1 $\overline{A}.\overline{B}$ |
| 56 | 5 $\overline{A}.\overline{B}$ | 4 $A.\overline{B}$ | 3 A.B | 4 $A.\overline{B}$ | 5 $\overline{A}.\overline{B}$ |

It is clearly apparent from Table II that the impedance variation represented by paths 50 and 52, resulting from loss of synchronism between the generators 14 and 16, can be distinguished from the impedance variation represented by paths 54 and 56, resulting from power oscillations. This basically results from the fact that with the previously-proposed relay arrangement, zones 2 and 4 are both indicated by the same combination of logic signals, while with the relays 22 and 24, zones 2 and 4 are indicated by different logic signal combinations.

It is the function of the sequential logic circuit 49 to distinguish between the different logic signal sequences indicating impedance variations in accordance with paths 50 and 52 on the one hand, and impedance variations in accordance with paths 54 and 56 on the other hand. To this end, the circuit 49 comprises an OR gate 60 arranged to receive the logic signals A and B applied to the inputs 46, 48 and to generate therefrom a logic signal $S=A+B$, indicating that the sensed impedance lies in one of zones 2, 3 and 4 of the RX diagram of FIG. 2. The circuit 49 also includes inverters 62, 64 connected to the terminals 46, 48 respectively, for generating logic signals $\overline{A}$ and $\overline{B}$ respectively, and an AND gate 66 is connected to receive the logic signals A and $\overline{B}$ so as to generate a logic signal $G=A \cdot \overline{B}$, indicating that the sensed impedance lies in zone 4, while a further AND gate 68 is connected to receive the logic signals $\overline{A}$ and B so as to generate a logic signal $D=\overline{A} \cdot B$, indicating that the sensed impedance lies in zone 2.

An AND gate 70 is connected to receive the logic signal S and the output produced by an OR gate 72 connected to receive the logic signal D and the output of the AND gate 70: the AND gate 70 thus produces a logic signal $V_1 = S \cdot (D + V_1)$, which serves to record that the sensed impedance entered the area comprising zones 2, 3 and 4 via zone 2, i.e. from zone 1.

Similarly, an AND gate 74 is connected to receive the logic signal S and the output produced by an OR gate 76 connected to receive the logic signal G and the output of the AND gate 74: the AND gate 74 thus produces a logic signal $V_2 = S \cdot (G + V_2)$, which serves to record that the sensed impedance entered the area comprising zones 2, 3 and 4 via zone 4, ie from zone 5.

Finally, the circuit 49 includes two more inverters 78, 80 arranged to generate logic signals $\overline{V_1}$ and $\overline{V_2}$ respectively, four AND gates 81 to 84, and two OR gates 86, 88.

The AND gate 81 receives the logic signals $V_1$ and G to produce an output logic signal $C_1 = V_1 \cdot G$, which indicates that the sensed impedance, having entered the area comprising zones 2, 3 and 4 via zone 2, has moved on to zone 4, ie is following a path similar to the path 50.

The AND gate 82 receives the logic signals $V_2$ and D to produce an output logic signal $C_2 = V_2 \cdot D$, which indicates that the sensed impedance, having entered the area comprising zones 2, 3 and 4 via zone 4, has moved on to zone 2, ie is following a path similar to the path 52.

It will be appreciated that each of the signals $C_1$ and $C_2$ is indicative of the onset of loss of synchronism between the generators 14, 16. Accordingly, the signals $C_1$, $C_2$ are applied to the OR gate 86, whose logic output signal LS can be used to operate an alarm, and/or operate via the aforementioned control system to attempt to restore synchronism, and/or to operate safety switchgear to isolate the faulty generator.

The AND gate 83 receives the logic signals $V_1$ and $\overline{V_2}$ to produce an output logic signal $C_3 = V_1 \cdot \overline{V_2}$, while the AND gate 84 receives the logic signals $\overline{V_1}$ and $V_2$ to produce an output logic signal $C_4 = \overline{V_1} \cdot V_2$. The signals $C_3$ and $C_4$ are each indicative of power oscillations, and they are applied to the OR gate 88 to produce a logic output signal PO which can be used for warning purposes.

It will be appreciated that the logic circuit 49 has been simplified to show only the most significant components concerned with distinguishing power oscillations from loss of synchronism. In particular, timing circuitry, well known to those skilled in the art, has been omitted for the sake of clarity, as has the known circuitry which operates safety switchgear if the sensed impedance moves substantially instantaneously into the fault band defined by the inner parallel lines 26, 32 (A·B).

Several modifications can be made to the described embodiment of the invention. In particular, only two of the relays 22a, 22b 24a, 24b need be provided, for example the relays 22a and 24b defining the lines 26 and 32 respectively. This results in a division of the RX diagram of FIG. 2 into three distinguishable zones, respectively a first zone 1' consisting of zones 1 and 2, a second zone 2' consisting of zone 3 and a third zone 3' consisting of zones 4 and 5. The sequential logic circuit 49 is then modified to distinguish the sequences 1', 2', 3' and 3', 2', 1' on the one hand from the sequences 1', 2', 1' and 3', 2', 3' on the other hand.

Alternatively and preferably, the relays 22 and 24 can each be replaced by relays of the type having a quadrilateral characteristic defined by a parallelogram in its RX diagram, as described with reference to FIG. 4.4 in the aforementioned paper by Messrs. Mouton and Souillard or FIG. 4 of the aforementioned UK patent specification. The parallelogram for one relay is defined by the lines 26, 28 and the dotted lines 26a, 28a of FIG. 2, while that for the other relay is defined by the lines 30, 32 and 30a, 32a: it can be seen that the band defined by the lines 26a, 28a overlaps the band defined by the lines 30a, 32a in a manner exactly analogous to the overlap of the bands defined by the lines 26, 28 and 30, 32. In this case, the sequential logic circuit 49 can simply be duplicated or otherwise modified to produce the desired outputs.

I claim:

1. Protective apparatus to be mounted at one end of an A.C. electrical power line coupled between normally-synchronised generators for producing at least a first output signal, the state of which differs according as a loss of synchronism between the generators or power oscillations occurs, this apparatus comprising at least first and second impedance sensing means producing respectively first and second indicative signals, said first indicative signal having a first or a second of two different states according as the apparent impedance of the line lies inside or outside a first impedance area, said second indicative signal having a first or a second of two different states according as said apparent impedance lies inside or outside a second impedance area, the first and second areas having an area of overlap in common through which the line impedance passes in the event of a loss of synchronism, this apparatus further comprising an output circuit connected to said impedance sensing means for generating at least said first output signal depending on at least one sequence of three changes of state of said first and second indicative signals, wherein said output circuit is responsive to sequences of at least three changes of states affecting indifferently said first and second indicative signals in order to produce said first output signal in a first or a second state only according as the sensing means sensed or not a sequence of at least three changes of state in which any two consecutive changes of state of the sequence concern two different signals.

2. Apparatus as in claim 1, wherein said output circuit generates in addition a second output signal, this second output signal being in a first or a second state, only according as the sensing means have sensed or not a sequence of at least three changes of state of said indicative signals, in which two consecutive changes of states of a same indicative signal take place.

3. Apparatus as in claim 1, wherein said indicative signals are digital logic signals and wherein said output circuit is a sequential logic circuit comprising logic gates and inverters.

4. Apparatus as in claim 3, wherein said first and second impedance areas are impedance bands each being defined by two parallel straight lines in a RX diagram, said impedance sensing means comprising two band-type impedance relays.

5. Apparatus as in claim 4, wherein the impedance sensing means comprises two impedance relays each of the type having a quadrilateral characteristic defined by a respective parallelogram in its RX diagram, the bands defined by each pair of opposite sides of the parallelogram of one relay being parallel to, and having an area of overlap with, the corresponding bands of the other relay.

* * * * *